Sept. 26, 1967 G. R. BRIGGS 3,344,414
MAGNETIC SHIFT REGISTER
Filed March 5, 1964 2 Sheets-Sheet 1

INVENTOR.
GEORGE R. BRIGGS
BY
Carl V. Olson
ATTORNEY

MAGNETIC SHIFT REGISTER

Filed March 5, 1964

2 Sheets-Sheet 2

INVENTOR.
GEORGE R. BRIGGS
BY
Carl V. Olson
ATTORNEY 3,344,414
MAGNETIC SHIFT REGISTER
George R. Briggs, Princeton, N.J., assignor to Radio Corporation of America, a corporation of Delaware
Filed Mar. 5, 1964, Ser. No. 349,578
8 Claims. (Cl. 340—174)

This invention relates to information storage and transfer systems such as are employed in magnetic shift registers.

The invention has for an object the provision of an improved magnetic shift register which is capable of higher operating speeds than have been achieved with comparable prior art arrangements and which is relatively immune to damage in the presence of high nuclear radiation.

According to an example of the invention, a cascaded arrangement of two-aperture magnetic cores is used in which three magnetic cores A, B and C are used for each information bit stage of the register. An information transfer circuit includes an input winding on each core passing in opposite directions through the two apertures of the core, an output winding on each core passing in opposite directions through the two apertures of the core and means including a diode coupling the output winding of each core except the last one to the input winding of the next following core. Three shift windings are provided, one for the A cores, one for the B cores and one for the C cores, each shift winding passing in the same direction through the two apertures of each corresponding core. Shift pulse means are coupled to the shift windings sequentially to supply an advance pulse to A cores at the same time that a receive pulse is supplied to B cores, and so on, in accordance with a three-phase shifting arrangement. Receive pulses supplied to the shift windings are additive to the information input signals in their effects around the first apertures of information receiving cores, and are subtractive from the information input signal in their effects around the second apertures of the same cores.

Figure 1:
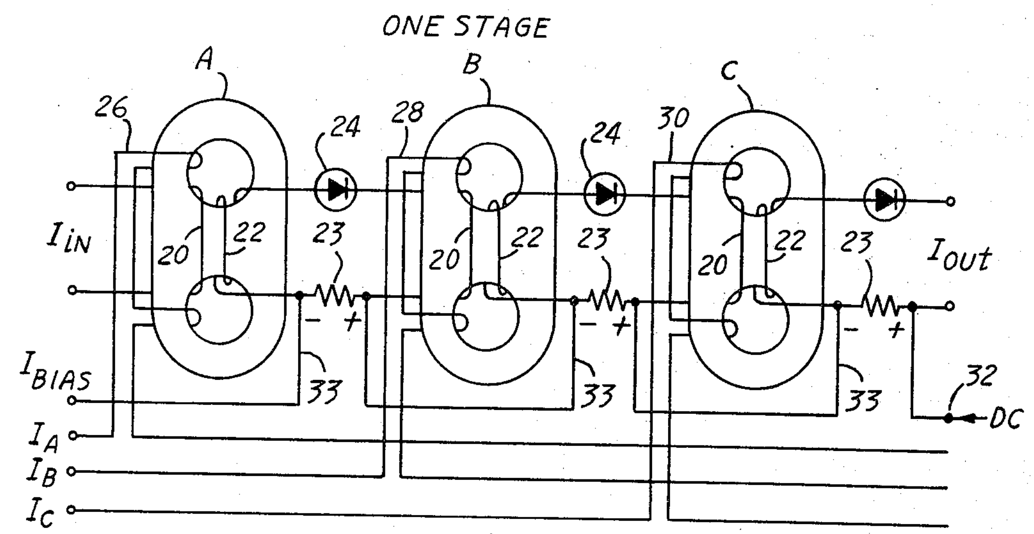
FIG. 1 is a diagram illustrating one information bit stage of a shift register which may contain any number of similar stages connected in cascade.

Referring now to FIG. 1, there is shown a shift register stage including three two-aperture magnetic cores A, B and C made of a square loop material such as ferrite. The cores as oriented in the drawing have an upper aperture and a lower aperture defining an upper magnetic leg, a central magnetic leg and a lower magnetic leg. The upper and lower magnetic legs are dimensioned to have equal cross-sectional areas. The central magnetic leg has a cross-sectional area equal to the sum of the cross sectional areas of the upper and lower legs.

Each magnetic core is provided with an input winding 20 which passes in opposite directions through the two apertures of the core. Each core is also provided with an output winding 22 which passes in opposite directions through the two apertures of the core. The output winding 22 on a core is reversed in direction compared with the input winding 20 on the same core. The output winding 22, as shown, preferably is a two-turn winding, whereas the input winding 20 may be a single-turn winding.

Figure 3:
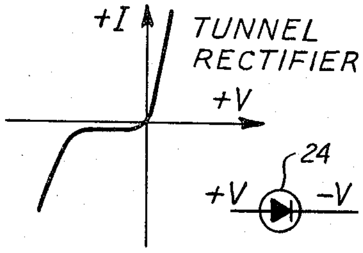
FIG. 3 is a current-voltage characteristic chart of a tunnel rectifier (also called backward diode) which is especially useful for inclusion in the shift register of FIG. 1.

The output winding 22 of each core except the last one, is connected to the input winding 20 of the following core through a loop path including a bias resistor 23 and a unidirectional current conductive device 24 which is preferably a tunnel rectifier, also known as a backward rectifier. The current-voltage characteristics of the tunnel rectifier are shown in FIG. 3 and related to the rectifier symbol 24 used in FIG. 1. When a voltage is applied across the tunnel rectifier 24 tending to cause a current through the rectifier in the direction of the arrowhead, the rectifier presents little impedance to the flow of current. When the voltage across the tunnel rectifier 24 is such as to produce a current flow in a direction opposite to that of the arrowhead, the rectifier presents a relatively high impedance to the flow of current unless the voltage is quite high, in which case the rectifier presents a relatively low impedance to the flow of current.

A shift winding 26 is provided on the A core and arranged to pass through both apertures of the core in the same direction. The shift winding 26 extends to and similarly passes through the apertures of all A cores of other similar stages that may be included in the shift register. A similar shift winding 28 passes in the same way through all of the B cores in the shift register. Finally, a third shift winding 30 passes through apertures of all of the C cores of the shift register. The input and shift windings on a core pass through the two apertures of the core in directions so that currents in these two windings produce additive effects on the flux around one aperture and subtractive effects on the flux around the other aperture.

The three shift windings 26, 28 and 30 associated with the respective cores A, B and C are each provided with respective input terminals designated $I_A$, $I_B$ and $I_C$ to which, during operation, respective sources of shifting pulses are connected. The sources provide shifting pulse signals as represented by the current waveforms similarly designated $I_A$, $I_B$ and $I_C$ in FIG. 2. The opposite ends of the shift windings 26, 28 and 30, after passing through corresponding cores of other stages (not shown) of the shift register are provided with the usual return paths (not shown).

Improved speed and reliability can be obtained by inclusion of means to supply a fixed biasing direct current from a terminal 32 through conductors 33 and bias resistors 23. The resulting indicated voltage polarity developed across each bias resistors 23 reverse biases the tunnel rectifier 24 in the loop path 20, 24, 22 and 23. This provides a threshold which tends to block small spurious signals that might otherwise be transferred as information signals.

Figure 2:
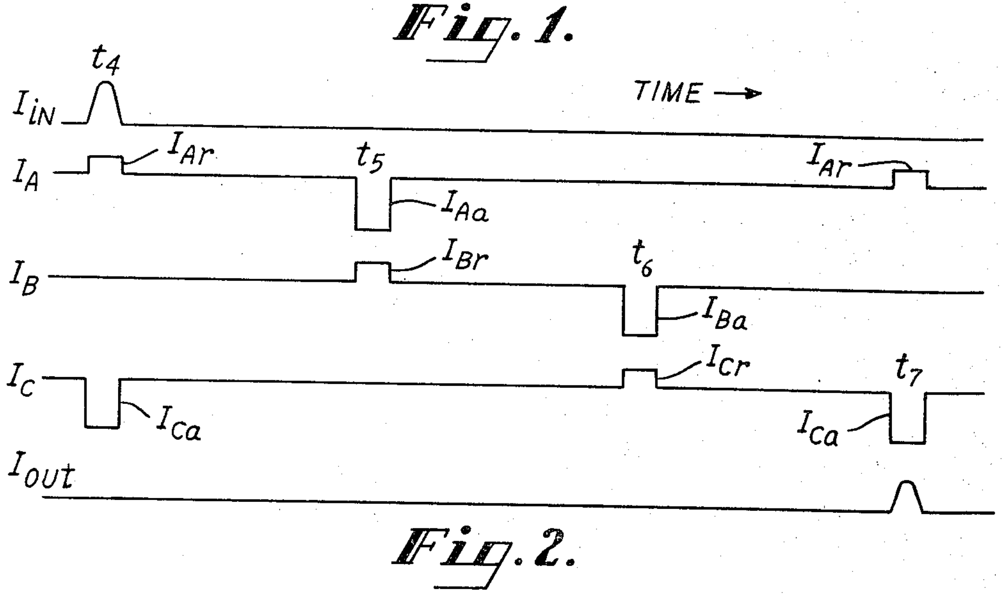
FIG. 2 is a chart of current waveforms which will be referred to in describing the operation of the shift register stage of FIG. 1.
Figures 4, 5, 6, 7:
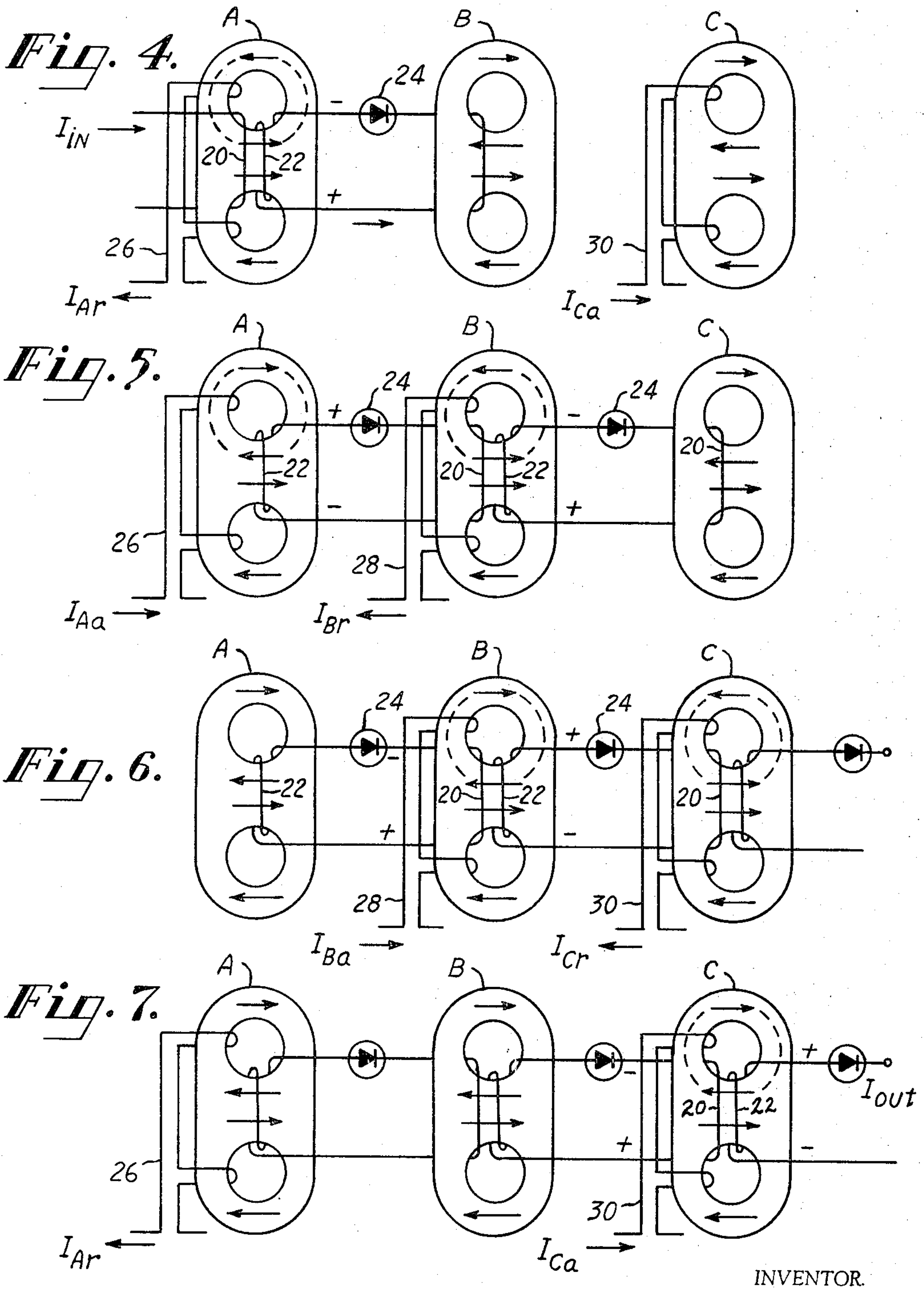
FIGS. 4 through 7 are diagrams of current and flux conditions in the one stage of the shift register of FIG. 1 during four successive periods of time in the operation of the register.

Reference will now be made to FIG. 2 nad FIGS. 4 through 7 for a description of the operation of the one stage illustrated in FIG. 1 of a shift register. The description assumes that all three cores A, B and C are initially in the cleared or 0 indicating condition in which remanent flux exists in a clockwise direction around all of the upper apertures and exists also in a clockwise direction around all of the lower apertures. It is assumed, referring to FIG. 4, that a 1 indicating input signal $I_{in}$ is applied to the input winding 20 of the core A at the time $t_4$ shown in FIG. 2. At the same time $t_4$, a receive pulse $I_{Ar}$ is applied to shift winding 26 in a direction which is additive to the information input signal $I_{in}$ in its effect around the upper aperture and subtractive from the information input signal $I_{in}$ in its effect around the lower aperture of core A. The combined amplitude of the 1 input signal and the receive pulse $I_{Ar}$ is sufficient to partially or completely reverse the direction of flux around the upper aperture of the A core to the counterclockwise direction. There is no change, or at most a smaller change, in the direction of flux around the lower aperture. The A core after time $t_4$ as represented by FIG. 4, contains a stored 1. At the same time $t_4$, an advance pulse $I_{Ca}$ is applied to the shift winding 30 of cleared core C in a direction not causing any change in flux because of the direction of the current supplied.

Reference is now made to FIG. 5 for a description of the conditions following the pulses which occur at the time $t_5$ in FIG. 2. At time $t_5$, an advance pulse $I_{Aa}$ is applied to shift winding 26 to switch the flux around the upper aperture back to its initial 0 indicating direction, with the result that a 1 indicating signal is induced on output winding 22 and is coupled through diode 24 to input winding 20 of core B. At the same time $t_5$, a receive pulse $I_{Br}$ is applied to the shift winding 28 of core B which is additive, in relation to the input information signal, around the upper aperture of core B. The combined effects of the two signals is to cause a switching of flux around the upper aperture of core B so that core B thereafter stores the 1 information bit previously stored in core A. The subtractive effects of the input and receive signals at the lower aperture prevent any apprecibale flux change around the lower aperture.

This switching of flux around the upper aperture of core B results in the undesirable induction of a signal in the output winding 22 of core B which is coupled to the input winding 20 of core C. However, the back resistance presented by the intervening tunnel rectifier 24 and the absence of a receive pulse at core C prevents any disturbance of a 0 indicating magnetic state of core C.

FIG. 6 shows the magnetic states of the stages of the shift register following time $t_6$. At time $t_6$ an advance pulse $I_{Ba}$ is applied to shift winding 28 of core B in a direction tending to reverse the 1 indicating flux direction around the upper aperture to the clockwise direction illustrated in FIG. 6. This induces a 1 indicating signal in output winding 22 of core B which is coupled to the input winding 20 of core C. At the same time $t_6$, a receive pulse $I_{Cr}$ is applied to shift winding 30 of core C in a direction which with respect to the input signal is additive around the upper aperture and subtractive around the lower aperture of core C. The flux around the upper aperture of core C switches to the counter-clockwise 1 indicating direction illustrated in FIG. 6.

The switching at time $t_6$ of the flux around the upper aperture of core B results in the induction in input winding 20 of a current which undesirably tends to flow backward to the output winding 22 of core A. However, the absence of a receive pulse on the core A prevents this induction current from producing a disturbance of the flux stored in core A, since this backward current by itself is not sufficient to produce a field in the core exceeding its coercive force threshold.

FIG. 7 shows the magnetic conditions of the cores following time $t_7$. At time $t_7$, an advance pulse $I_{Ca}$ is applied to core C to restore the direction of flux around the upper aperture to the 0 indicating direction, and in the process to generate a 1 indicating an output signal at the output terminal $I_{out}$. At the same time $t_7$ a receive pulse $I_{Ar}$ is applied to shift winding 26 of core A. This receive pulse conditions core A to receive a 1 input if it is supplied to the input winding 20. In other words, core A can receive an input signal at the same time $t_7$ that core C is supplying an output signal. The operation of the shift register stage is such that there is always an isolating core storing a 0 interposed between cores receiving or accepting an information signal.

A shift register as described, using small cores having 10 milli-inch apertures and commercial tunnel rectifiers, is capable of operation at a rate in which information bits are transferred from one stage to the next at a rate of five megacycles, or a cycle time of one-fifth microsecond. This information transfer rate involves a transfer of information from one core to the next core at a fifteen megacycle rate, or a cycle time of $\frac{1}{15}$ microsecond or sixty-seven nanoseconds.

What is claimed is:

1. An information storage and transfer system comprising
   two magnetic cores A and B each having two apertures,
   an information transfer circuit including an input winding on each core passing through both apertures therein, an output winding on each core passing through both apertures therein, and means coupling the output winding of one core to the input winding of the other core,
   two shift windings, one for the A core and one for the B core, each shift winding passing through both apertures of corresponding cores, the input and shift windings on a core passing through the two apertures in directions so that currents in the two windings produce additive effects on the flux around one aperture and subtractive effects on the flux around the other aperture, and
   shift pulse means coupled to said shift windings sequentially to supply a receive pulse to the A core, to supply an advance pulse to the A core at the same time that a receive pulse is supplied to B core, and to supply an advance pulse to the B core.
2. A system as defined in claim 1 wherein said means coupling the output winding of the A core to the input winding of the B core includes a tunnel rectifier.
3. A system as defined in claim 2 wherein said means coupling the output winding of the A core to the input winding of the B core includes an impedance through which a bias current is supplied to back bias said tunnel rectifier.
4. The combination of
   three magnetic cores A, B and C, each magnetic core having two apertures,
   an information transfer circuit including an input winding on each core passing through both apertures of the core, an output winding on each core passing through both apertures of the core, and means coupling the output winding of each core except the last one to the input winding of the next following core,
   three shift windings for respective ones of said A, B and C cores, each shift winding passing through both apertures of a corresponding core, the input and shift windings on a core passing through the two apertures in directions so that currents in the two windings produce additive effects on the flux around one aperture and subtractive effects on the flux around the other aperture, and
   shift pulse means coupled to said shift windings sequentially to supply a receive pulse to the A core, to supply an advance pulse to the A core at the same time that a receive pulse is supplied to the B core, to supply an advance pulse to the B core at the same time that a receive pulse is supplied to the C core and to supply an advance pulse to the C core.
5. A magnetic shift register comprising
   a plurality of magnetic cores each having two apertures,
   an information transfer circuit including an input winding on each core passing through both apertures of the core, an output winding on each core passing through both apertures of the core, and means coupling the output winding of each core except the last one to the input winding of the next following core,
   a plurality of shift windings each passing through both apertures of a corresponding core, the input and shift windings on a core passing through the two apertures in directions so that currents in the two windings produce additive effects on the flux around one aperture and subtractive effects on the flux around the other aperture, and shift pulse means coupled to said shift windings sequentially to supply an advance pulse to one core at the same time that a receive pulse is supplied to the next following core.

6. A magnetic shift register comprising at least one set of three magnetic cores A, B and C, each magnetic core having two apertures, an information transfer circuit including an input winding on each core passing through both apertures of the core, an output winding on each core passing through both apertures of the core, and means coupling the output winding of each core except the last one to the input winding of the next following core, three shift windings, one for the A cores, one for the B cores and one for the C cores, each shift winding passing through both apertures of corresponding cores, the input and shift windings on a core passing through the two apertures in directions so that currents in the two windings produce additive effects on the flux around one aperture and subtractive effects on the flux around the other aperture, and shift pulse means coupled to said shift windings sequentially to supply an advance pulse to A cores at the same time that a receive pulse is supplied to B cores, to supply an advance pulse to B cores at the same time that a receive pulse is supplied to C cores and to supply an advance pulse to C cores at the same time that a receive pulse is supplied to A cores.

7. A magnetic shift register comprising at least one set of three magnetic cores A, B and C, each magnetic core having two apertures, an information transfer circuit including an input winding on each core passing in opposite directions through both apertures of the core, an output winding on each core passing in opposite directions through both apertures of the core and in the opposite direction in relation to the direction of the input winding, and means coupling the output winding of each core except the last one to the input winding of the next following core, three shift windings, one for the A cores, one for the B cores and one for the C cores, each shift winding passing in the same direction through both apertures of corresponding cores, so that currents in the input and shift windings on a core produce additive effects on the flux around one aperture and subtractive effects on the flux around the other aperture, and shift pulse means coupled to said shift windings sequentially to supply an advance pulse to A cores at the same time that a receive pulse is supplied to B cores, to supply an advance pulse to B cores at the same time that a receive pulse is supplied to C cores and to supply an advance pulse to C cores at the same time that a receive pulse is supplied to A cores.

8. A shift register as defined in claim 7 wherein each of said coupling means includes a tunnel rectifier.

References Cited

UNITED STATES PATENTS 3,213,435 10/1965 Bruce ---------------- 340—174

BERNARD KONICK, *Primary Examiner.*

R. MORGANSTERN, *Assistant Examiner.*